March 31, 1942. H. QUENON 2,278,213
SIGNAL
Filed April 29, 1940 2 Sheets-Sheet 1
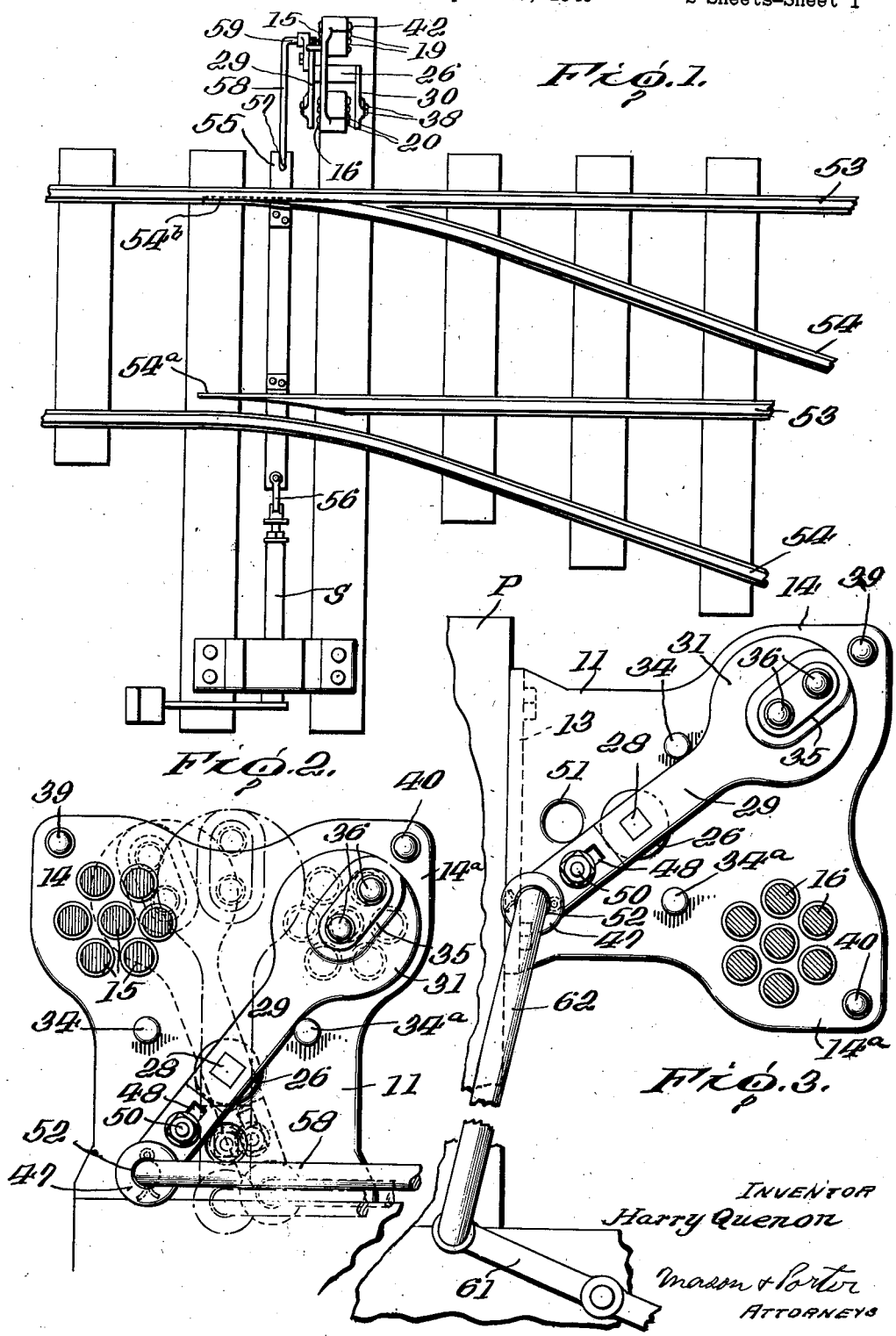
INVENTOR
Harry Quenon
Mason & Porter
ATTORNEYS

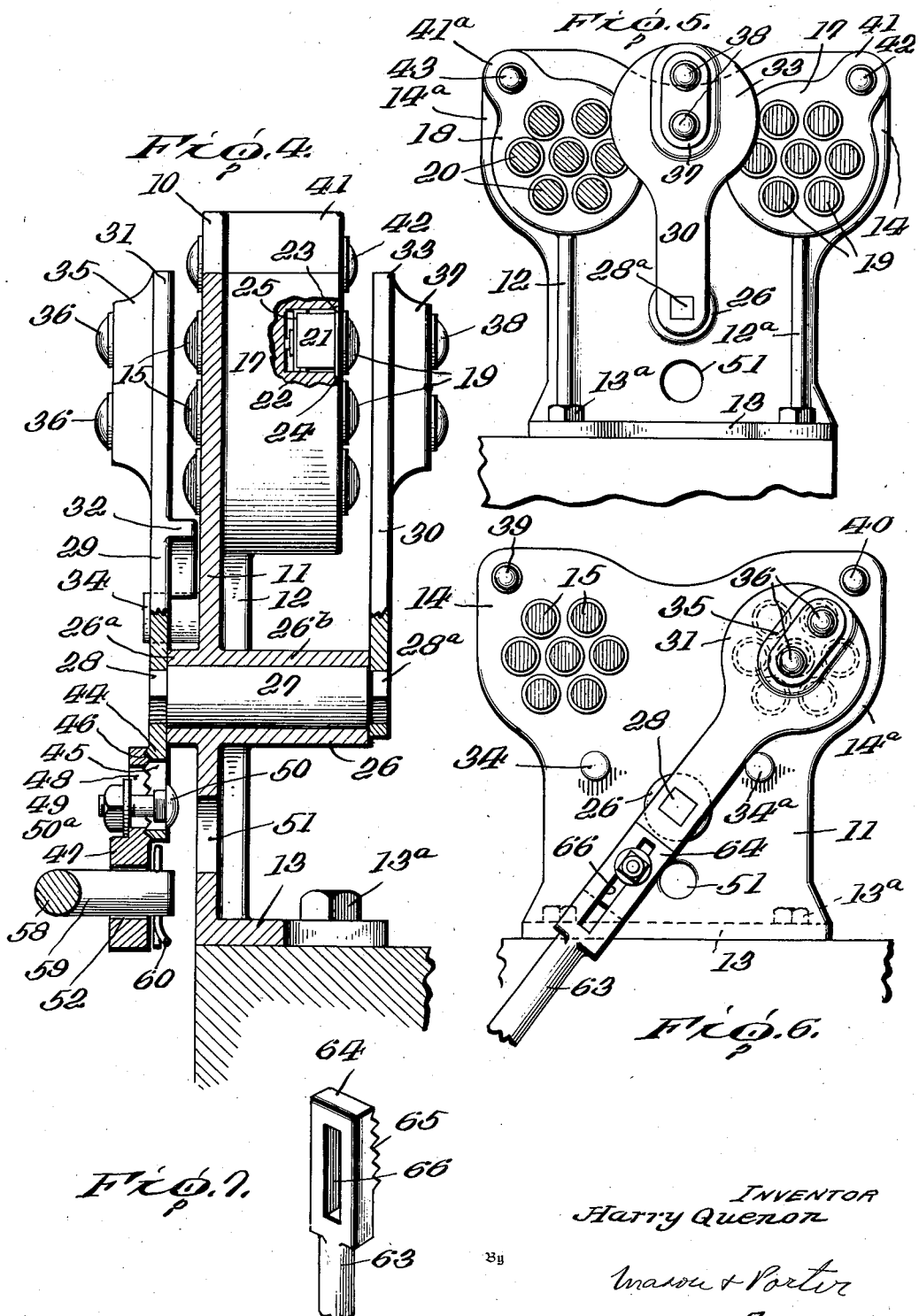

Patented Mar. 31, 1942

2,278,213

UNITED STATES PATENT OFFICE 2,278,213

SIGNAL

Harry Quenon, Keystone, W. Va., assignor to Portable Lamp & Equipment Company, Pittsburgh, Pa., a corporation of Pennsylvania Application April 29, 1940, Serial No. 334,035

12 Claims. (Cl. 246—476)

The present invention relates to new and useful improvements in signaling devices, and more particularly to improvements in a railway signal for indicating the condition of the track or switch to approaching trains.

In general, the present invention is concerned with the provision of a railway signal which is adapted for manual or automatic operation to indicate the condition of a track to the operator of approaching cars. The signal of the present invention is particularly adapted for installations in mines for indicating the condition of a switch or the condition of the track to the operator of approaching cars. The signal includes signal indicators preferably consisting of reflecting surfaces for reflecting the rays from the headlight of an approaching mine engine, so as to give to the operator of the approaching train an indication of the condition of the track or a switch.

An object of the present invention is to provide a signal having differently colored indicators associated therewith and wherein a movable arm is adapted to cover or partially cover one or another of the indicators so as to indicate the condition of a switch or the safe or unsafe condition of the track in advance of the approaching cars.

A further object of the invention is to provide a signal which is constructed and arranged for use in connection with a switch so that the position of the movable arm will indicate the direction in which the branch line turns from the main line.

A further object of the invention is to provide a signal of the above type wherein the signal indicators consist of light-reflecting surfaces and wherein additional light-reflecting surfaces, preferably of a different color, are employed in co-operation with the position of the movable arm to indicate the exact location of switch points in addition to indicating the direction of turning of the branch line from the main line.

A still further object of the invention is to provide a switch signal of the above type having two differently colored reflecting surfaces for indicating the condition of the track and having reflecting surfaces of another color associated with the movable arm for indicating whether the switch points are split or not tightly closed.

The invention still further aims to provide a signal of the above type which is constructed and arranged with identical indicator surfaces on opposite sides thereof and in line with one another and with a pair of arms movable in unison whereby the signal may be simply reversed on its mounting for use with right- and left-hand switches in order to give identical signals regardless of the direction of turning of the branch line from the main line.

The invention still further aims to provide a signal of the above type having an adjustable connection between the movable arm and a switch operating mechanism so as to permit adjustment for taking up wear in the switch mechanism, and also to permit the application of a handle device to enable the signal to be hand operated in various instances.

The above and other objects of the invention will in part be obvious and will be hereinafter more fully pointed out.

In the accompanying drawings,

Figure 1 is a top plan view of a conventional switch with the signal device of the present invention associated therewith.

Figure 2 is an enlarged front elevation of the signal shown in Figure 1, showing in full lines the position of the movable arm for indicating the direction of the branch line of Figure 1; showing in dot-dash lines the position of the movable arm to indicate a split switch; and showing in dotted lines the position of the movable arm to indicate that the switch points are not completely closed.

Figure 3 is a front elevation of the switch signal mounted on an upstanding support for use in instances where it is difficult for a train operator to see the signal.

Figure 4 is a further enlarged sectional view of the signal, taken along the line 4—4 of Figure 2.

Figure 5 is a rear elevation of the signal shown in Figures 1 and 2, with the movable arm disposed in an intermediate position.

Figure 6 is a front elevation of the switch signal showing the attachment of a handle to the movable arm, thus permitting the signal to be used above a track and to be manually actuated as the operator passes thereunder.

Figure 7 is a fragmentary detail perspective view of the portion of the handle which is connected to the movable arm.

Referring more in detail to the accompanying drawings, the signal includes a body member 10 in the form of a casting. This body member includes an upstanding wall portion 11 which is provided with vertical strengthening ribs 12, 12a and with a lateral base portion 13 which is adapted to be secured by bolts 13a or the like to a suitable support. The wall portion 11 is provided with outwardly projecting portions 14, 14a at the top thereof to provide space for signal indicators 15, 16 on the front face thereof. These signal indicators are preferably in the form of reflecting buttons which are grouped together to provide reflecting surfaces which, in turn, provide separately defined areas adapted to be controlled for giving visual signals as to the condition of the switch.

The rear face of the wall 11 is provided with rearwardly extending bosses 17, 18 which are also provided with reflecting buttons 19, 20, arranged in line with the groups of buttons 15, 16, respectively, on the front face of the wall portion. As shown in Figure 4, the reflecting buttons are secured to a base portion 21 which is inserted within recesses 22 in the casting 10. The edges 23 of the base portion 21 fit within countersunk recesses 24 in the casting so as to prevent removal of the buttons by prying. The base portion 21 has secured to the bottom thereof a metal locking member 25 which is forced into engagement with the walls of the recesses 22 when the buttons are inserted, thus forming a friction-tight connection so that the buttons are substantially theft proof.

The wall portion 11 of the casting is provided with a bearing sleeve 26 which is disposed slightly above the base portion 13 and below the reflecting buttons centrally therebetween. The sleeve 26 includes a front portion 26a which extends forwardly of the front face of the wall 11, and a rear portion 26b which extends rearwardly of the rear face of the wall 11. A pivot shaft 27 extends through the sleeve 26 and is provided with squared ends 28, 28a. A front arm 29 is mounted on the squared end 28 of the pivot shaft 27 and a rear arm 30 is mounted on the squared end 28a of the pivot shaft so that movement of the arm 29 will effect movement of the arm 30 in unison therewith. The arm 29 is in the form of a paddle having an enlarged substantially circular end portion 31 which is dimensioned so as to completely cover either group of reflecting buttons 15 or 16 when in proper position. The portion 26a of the sleeve 26 extends forwardly of the wall 11 so as to space the arm 29 away from the buttons 15, 16. A rearwardly extending rib 32 is formed on the arm 29 so as to provide a safety device for preventing the arm from being jammed rearwardly into contact with the buttons, thus guarding against the breaking thereof. The arm 30 is also in the form of a paddle which includes an enlarged substantially circular portion 33 dimensioned so as to completely cover one or another of the groups of buttons 19, 20. The portion 26b of the sleeve 26 extends rearwardly of the wall 11 a distance sufficient to space the arm 30 away from the buttons 19, 20. The front face of the casting 10 is provided with forwardly extending stop lugs 34, 34a against which the arm 29 will abut when in either of its extreme positions, thus assuring proper covering of the indicator buttons.

The arm 29 has an outwardly extending portion 35 on the circular end 31 thereof. A pair of reflecting buttons 36 are mounted in the outwardly extending portion 35, and these buttons 36 are in alignment with the central axis of the arm 29. The arm 30 also has an outwardly extending portion 37 in which are similarly mounted a pair of reflecting buttons 38 which are in line with the central axis of the arm. In each upper corner of the front face of the casting 10, there are mounted reflecting buttons 39, 40. The bosses 17, 18 on the rear face of the wall of the casting are provided with outwardly extending lug portions 41, 41a in each of which is mounted a reflecting button 42, 43 in line with the buttons 39, 40, respectively. The stop lugs 34, 34a and the corner reflecting buttons 39, 40, 42, 43 are positioned on the casting in such relationship that the reflecting buttons on the arms will become exactly aligned with the corner reflecting buttons when the arms are exactly in either of their extreme positions. When in such extreme positions with the arm 29 abutting against one of the stop lugs 34 or 34a, the reflecting buttons on the arms and one or another of the corner reflecting buttons will be in exact alignment, thus forming a straight line.

For the purpose of operating the signal, the lower portion 44 of the arm 29 below the pivot shaft 27 is provided with a longitudinal slot 45 and an outer serrated surface 46. A bar or link 47 (Figure 4) has a slot 48 in the upper portion thereof and an inner serrated surface 49 adapted to cooperate with the serrated surface 46 on the arm 29. The slots 45, 48 are in lateral registration with one another and a bolt 50 is adapted to extend through the slots. A nut 50a engages the bolt 50 on the outer surface of the link 47 so as to secure the parts together. In order to facilitate removal of the bolt 50 the wall portion 11 of the casting is provided with an opening 51 through which the bolt 50 may be removed or loosened to permit adjustment of the link 47.

The lower end of the link 47 is provided with an aperture 52 therethrough for the purpose of connecting the same to a conventional switch mechanism. As shown in Figure 1, the signal is illustrated in association with a switch mechanism. The main line is indicated by the rails 53, and the branch line which turns to the right is illustrated by the rails 54. The switch points 54a, 54b are illustrated as being positioned so that the branch line is in communication with the main line. Thus, the switch point 54a is spaced from one main rail while the switch point 54b is in contact with the opposite main rail. A switch operating mechanism S may be of any suitable type, that is, manual or automatic in operation, and includes a laterally shifting switch bar 55 which is connected by a suitable coupling 56 with the switch operating mechanism. The free end of the switch bar 55 has a vertical aperture 57 in which one end of a connecting link 58 is disposed. The opposite end 59 of the link 58 extends into the aperture 52 in the arm 47 and is secured therein by a cotter pin 60 or the like. Thus, movement of the switch bar 55 will effect movement of the signal arms 29, 30. In the position of the switch shown in Figure 1, the switch bar 55 is moved toward the signal so that the arm 29 covers the reflecting buttons 16 which are preferably green in color. The arm 30 also covers the reflecting buttons 20 which are also preferably green in color. The other reflecting buttons 15 are preferably red in color, as are the oppositely disposed reflecting buttons 19. In this position of the switch, the red reflecting buttons 15 will be exposed so as to indicate that the main line is closed and that the branch line is open. The buttons 36, 38, 39, 40, 42 and 43 are preferably of a color different from the other reflecting buttons. Thus, these reflecting buttons may be yellow or white. The location of the arm 29 in Figure 1 will indicate by the reflecting buttons 36, 40 that the branch line turns to the right of the main line. When the buttons 36 on the arm 29 are in exact alignment with the reflecting button 40, this will indicate that the switch is exactly set.

When the switch, as shown in Figure 1, is shifted so that the switch point 54a contacts with one of the main rails and so that the switch point 54b is spaced from the other main rail, the branch line will be closed and the main line will be opened. During movement of the switch bar 55 for this purpose, the signal arm 29 will be shifted so that the circular portion 31 overlies the red reflecting buttons 15, thus exposing the green reflecting buttons 16 to indicate that the main line is open. When the signal arm 29 is in either extreme position abutting against the stops 34 or 34a, one or the other of the groups of reflecting buttons 15, 16 will be completely covered, and the reflecting buttons 36 will become aligned with either the reflecting button 39 or the reflecting button 40. Either extreme position of the arm 29 substantially coinciding with and covering either area to be controlled will indicate that the switch is exactly set in either direction and the location of the arm 29 will indicate the direction of the branch line. One such position of the arm 29 is shown in Figure 2 where the arm is in position contacting with the stop 34a. As shown by the dot and dash lines of Figure 2, the arm 29 is in an intermediate position between the reflecting buttons 15, 16. This position of the arm 29 indicates that the switch is split. As indicated by the dotted lines in Figure 2, the arm 29 does not completely cover all of the red reflecting buttons 15 so that the exposed portions of these buttons indicate that the switch is not exactly set. Furthermore, the buttons 36 on the arm are not in exact alignment with the button 39, thus further indicating that the switch is not completely set. Such a position of the switch often occurs when a piece of coal or other substance becomes jammed between the switch points to prevent complete closing thereof.

In some instances, where it is difficult for the operator of the mine locomotive to see a relatively low signal which is mounted on one of the cross-ties, as in Figure 1, the signal may be mounted laterally on an upstanding post P, as shown in Figure 3. With such a mounting of the signal, a toggle lever 61 mounted near the base of the post P is employed. One end of the toggle lever 61 is connected to the link 58 and the opposite end thereof is connected to a rod 62 which, in turn, is connected to the apertured end of the bar 47 on the arm 29. The link 58 is connected to the switch bar 55 in the same manner pointed out in connection with Figure 1, and operation of the arm 29 is effected by operation of the switch bar 55 through the toggle lever and bar 62. As shown in Figure 3, the arm 29 covers the red reflecting buttons 15 so that the green reflecting buttons 16 are exposed, thus indicating that the main line is open. Upon opening of the branch line and upon closing of the main line, the movement of the link 58 will effect movement of the signal arm 29 to cover the reflecting buttons 16.

The signal is also adapted for use in indicating the safety condition of a track without reference to a switch. For instance, the signal may be mounted overhead at the entrance to a mine room, as indicated in Figure 6. For this purpose, the bar 47 is detached from the arm 29 and a handle member 63 is employed. This handle member 63 includes a head portion 64 having a serrated inner face 65 and a longitudinal slot 66. The aperture 51 in the wall 11 of the casting permits removal of the bolt 50 and nut 50a to permit detaching of the bar 47. The head 64 of the handle member 63 may then be placed adjacent the lower end of the arm 29 with the serrated surfaces 65, 46 in engagement and the bolt 50 may again be passed through the coincident slots and the nut applied to secure the handle 63 to the arm 29. Thus, a motorman entering the room can simply reach overhead and clasp the handle 63 to swing the arm 29 to a position covering the green signal buttons 16, thus leaving exposed the red signal buttons to indicate danger. Upon leaving the room, the motorman can manipulate the arm 29 to the opposite position.

It is to be particularly noted that the signal of the present invention is reversible and that reflecting buttons are disposed on opposite sides thereof. Thus, the green reflecting buttons 16 on the front face of the casting are in substantial alignment with the green reflecting buttons 20 on the rear face of the casting. Similarly, the red reflecting buttons 15 on the front face of the casting are in substantial alignment with the red reflecting buttons 19 on the rear face of the casting. The signal or paddle arms 29, 30 are aligned and move in unison, and the reflecting buttons 36 and 38 on the ends of the arms are in substantial alignment, as are the corner reflecting buttons 39, 42 and 40, 43. Therefore, the signal device may be simply reversed on its support when a branch line turns off the main line to the left instead of to the right, as shown in Figure 1; and when the signal device is thus reversed on the supporting structure, the identical signal reflections will be given.

From the foregoing description, it will be seen that the signal of the present invention is one wherein one of the signal or paddle arms, depending upon the position of the signal device, can be shifted to completely cover the green or the red reflecting surfaces to give the proper condition of the track or switch. Of course, other colors may be employed, but the red and green colors are conventional. The position of the switch arm is clearly indicated by the yellow or white reflecting buttons thereon, but it is to be clearly understood that these reflecting buttons may be of other colors. One of the principal features of the invention is that the signal device includes separate signal indicator surfaces of a plurality of different colors. Thus, the casting or body member includes a plurality of separate reflecting surfaces preferably including groups of green and red reflecting buttons which constitute primary signal indicating surfaces. The reflecting buttons on the signal arm are of a third and different color and constitute a secondary signal indicating surface. If one of the red or green reflecting surfaces is not completely obliterated by the signal arm, the reflecting buttons on the arm do not become exactly aligned with the corner reflecting buttons on the body member, thus serving to indicate that the switch points are not tightly closed. Similarly, an intermediate position of the signal arm between the red and green reflecting surfaces will indicate the existence of a split switch. The signal device is constructed and arranged so that the green reflecting surface will indicate that the main line is open and so that the position of the switch arm will indicate the direction to which the branch line turns.

While the signal device has been illustrated as including colored indicating surfaces on both sides thereof for the purpose mentioned above, it is to be clearly understood that the signal device may be constructed with colored indicating surfaces only on one face thereof, in which case the secondary paddle or switch arm will be unnecessary.

It is to be clearly understood that various changes in the details of construction and arrangement of parts may be made without departing from the scope of the invention as set forth in the appended claims.

I claim:

1. A signal comprising a stationary body member having thereon a plurality of reflecting surfaces of different colors to indicate various conditions of a track, an element movable with respect to said body member for selectively obliterating at least a part of one or another of said reflecting surfaces whereby to indicate a specific condition of the track by the exposed reflecting surfaces, and means providing additional reflecting surfaces on the movable element and of a still different color for cooperation with certain of the reflecting surfaces on said body member whereby to further indicate specific safety conditions of the track.

2. A signal comprising a stationary body member having thereon a pair of primary reflecting surfaces of different colors to indicate various conditions of a track, means providing secondary reflecting surfaces on said body member of a third color, an element movable with respect to said body member for selectively obliterating at least a part of one or the other of said primary reflecting surfaces whereby to indicate a specific condition of the track by the exposed reflecting surface, and means providing additional reflecting surfaces on the movable element for cooperation with the secondary reflecting surfaces on said body member whereby to further indicate specific safety conditions of the track.

3. A switch signal comprising a body member adapted to be secured to a suitable support, means providing red and green reflecting surfaces on said body member, an arm pivotally mounted on said body member and adapted to obliterate one or the other of said reflecting surfaces whereby to indicate the condition of the switch by the exposed reflecting surface, light-reflecting means adjacent the reflecting surfaces on said body member, and means on said arm providing for the reflecting of light and said means being adapted to cooperate with the light-reflecting means on said body member whereby to indicate the exact position of the switch points depending upon the alignment or misalignment of the light-reflecting means and the means on said arm.

4. A switch signal comprising a body member adapted to be secured to a suitable support, means providing red and green reflecting surfaces on said body member, an arm pivotally mounted on said body member and adapted to obliterate one or the other of said reflecting surfaces whereby to indicate the condition of the switch by the exposed reflecting surface, light-reflecting means adjacent the reflecting surfaces on said body member, and means providing additional reflecting surfaces on said arm, the additional reflecting surfaces on said arm being adapted to cooperate with the light-reflecting means on said body member whereby to indicate the exact position of the switch points depending upon the alignment or misalignment of the light-reflecting means and the reflecting surfaces on said arm.

5. A switch signal comprising a body member adapted to be secured to a suitable support, means providing separate and spaced red and green reflecting surfaces on said body member, an arm pivotally mounted on said body member and having an enlarged portion adapted to at least partially obliterate one or the other of said reflecting surfaces whereby to indicate the condition of the switch by the exposed reflecting surfaces, a light-reflecting element of a third color or in each corner of said body member and located adjacent the said reflecting surfaces, and means providing a plurality of additional reflecting surfaces on said arm, the said additional reflecting surfaces on said arm being adapted to visually cooperate with the light-reflecting elements on said body member whereby to indicate the exact position of the switch points depending upon the alignment or misalignment of the light-reflecting elements and the reflecting surfaces on said arm.

6. A switch signal comprising a body member adapted to be secured to a suitable support, means providing separate red and green reflecting surfaces on opposite sides of said body member, the reflecting surfaces of each color on one side of the body member being aligned with identically colored reflecting surfaces on the opposite side of the body member whereby to permit the signal to be reversed and to give the same signal regardless of the direction of turning of a branch line from the main line, a main arm pivotally mounted on the front face of said body member and having means for attaching the said arm to a switch operating mechanism, and a second arm pivotally mounted on the opposite side of the body member and aligned with said main arm and movable in unison therewith, both of said arms being adapted to at least partially obliterate one or the other of said reflecting surfaces on the corresponding sides of said body member whereby to indicate the condition of the switch by the exposed reflecting surfaces.

7. A switch signal, as claimed in claim 6, wherein each side of the body member is provided with additional light-reflecting elements of a third color located adjacent the red and green reflecting surfaces, and wherein each of said arms is provided with additional reflecting surfaces adapted to cooperate with the light-reflecting elements whereby to indicate the exact position of switch points depending upon the alignment or misalignment of the light-reflecting elements and the reflecting surfaces on said arm.

8. A switch signal, comprising a body member adapted to be secured to a suitable support, means providing separate red and green reflecting surfaces on the front face of said body member, said body member having a pair of rearwardly extending bosses on the rear thereof, means providing red reflecting surfaces in one of said bosses and green reflecting surfaces in the other of said bosses, the red and green reflecting surfaces on each face of said body member being aligned with one another whereby to permit the signal to be reversed and to give the same signal regardless of the direction of turning of the branch line from the main line, a main operating arm pivotally mounted on the front face of said member and having means for attaching said arm to a switch operating mechanism, and a second arm pivotally mounted to move over the opposite face of said body member and aligned with said main operating arm and movable in unison therewith, both of said arms being adapted to at least partially obliterate one or the other of said reflecting surfaces on the corresponding faces of said body member whereby to indicate the condition of the switch by the exposed reflecting surfaces.

9. A switch signal, as claimed in claim 8, wherein the bosses on the rear face of said body member are provided with outwardly extending lugs having a reflecting element of a third color therein, and wherein both of said arms are provided with light-reflecting surfaces adapted for visual cooperation with said reflecting elements whereby to indicate the exact position of the switch points depending upon the alignment or misalignment of the said reflecting surfaces on said arms.

10. A switch signal comprising a stationary body member having at least on one face thereof separately defined areas to be controlled for giving visual signals as to the condition of the switch, at least one arm pivotally mounted on said body member and adapted to be actuated by movements of the switch points, said arm having a controlling portion substantially coextensive with each separate area on the body member and adapted to be moved relative to the face of the body member between extreme positions coinciding with one or another of the said areas on the body member whereby the coinciding of the controlling portion on said arm with one or another of the areas on the body member will indicate an exact safe condition of the switch, and means providing a reflecting surface on the controlling portion of said arm for indicating improper alignment of the arm when the switch points are not properly positioned whereby to indicate an unsafe condition of the switch.

11. A switch signal comprising a stationary body member having at least on one face thereof separately defined areas to be controlled for giving visual signals as to the condition of the switch, said body member having a projecting supporting wall provided with an aperture therethrough, at least one arm pivotally mounted on said body member and having adjacent one end thereof a controlling portion substantially coextensive with each separate area on the body member and adapted to be moved relative to the face of the body member between extreme positions coinciding with one or another of said areas on the body member whereby the coinciding of the controlling portion on said arm with one or another of the areas on the body member will indicate the condition of the switch, the opposite end of said arm being located close to said projecting wall and having a serrated surface provided with a longitudinal slot therethrough, a projecting member adapted to be connected to a switch operated device and having a serrated surface opposing and cooperating with the serrated surface on said arm and having a longitudinal slot laterally registering with the slot in said arm, and bolt means extending through the registering slots for maintaining said projecting member and the pivoted arm connected but permitting release and adjustment of the arm and the projecting member relative to one another, said registering slots permitting movement of the bolt means into alignment with the aperture through said projecting wall whereby to facilitate removal of the bolt means and complete separation of the projecting member from the pivoted arm.

12. A switch signal comprising a stationary body member having at least on one face thereof separately defined areas to be controlled for giving visual signals as to the condition of the switch, at least one arm pivotally mounted on said body member and adapted to be actuated by movements of the switch points, said arm having a controlling portion substantially co-extensive with each separate area on the body member and adapted to be moved relative to the face of the body member between extreme positions coinciding with one or another of said areas whereby coinciding of the controlling portion on said arm with one or another of the said areas on the body member will indicate an exact safe condition of the switch, reflecting means separate from the areas to be controlled, and means providing a reflecting surface on the controlling portion of said arm and said reflecting surface being adapted to cooperate with the said reflecting means for indicating improper alignment of the arm when the switch points are not properly positioned whereby to indicate an unsafe condition of the switch.

HARRY QUENON.